M. Chapman,
Attaching Handles to Knives.
N° 37,150.   Patented Dec. 16, 1862.

Witnesses
J. W. Coombs
G. W. Reed.

Inventor:
Matthew Chapman
per Munn & Co
Attorneys.

UNITED STATES PATENT OFFICE.

MATTHEW CHAPMAN, OF GREENFIELD, MASSACHUSETTS.

IMPROVEMENT IN ATTACHING HANDLES TO KNIVES.

Specification forming part of Letters Patent No. 37,150, dated December 16, 1862.

*To all whom it may concern:*

Be it known that I, MATTHEW CHAPMAN, of Greenfield, in the county of Franklin and State of Massachusetts, have invented a new and useful Improvement in Attaching Handles to Cutting and other Analogous Articles; and I do hereby declare that the following is a full, clear, and exact description of the same, reference being had to the accompanying drawings, making a part of this specification, in which—

Figure 1:
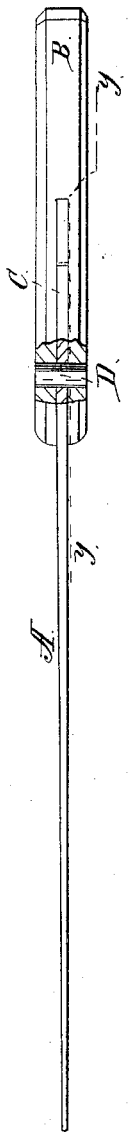
Figure 2:
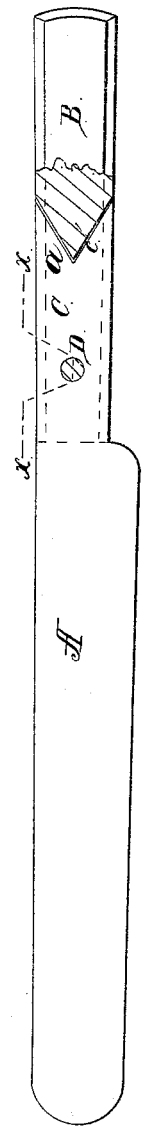
Figure 3:

Figure 1 is an edge view of a table-knife having a handle attached to it according to my invention, the handle being partly in section, as indicated by the line $x\,x$, Fig. 2; Fig. 2, a side view of the same, with the handle partly in section, as indicated by the line $y\,y$, Fig. 1; Fig. 3, a detached view of the handle.

Similar letters of reference indicate corresponding parts in the several figures.

This invention consists in having the handle of the knife or other article slotted longitudinally a certain distance from its inner end, and having the knife or other article provided with a flat tang equal in length to the slot, the end of the tang having a V-shaped notch made in it, and the end of the slot provided with a corresponding-shaped projection, which fits in the notch in the tang when the latter is inserted in the slot in the handle, the above parts being used in connection with a rivet, which passes through the handle and tang, as hereinafter shown and fully described.

The object of the invention is to obtain a simple and economical mode of attaching the knife or other article to the handle, and one which will form a firm attachment or connection.

To enable those skilled in the art to fully understand and construct my invention, I will proceed to describe it.

A represents the blade of a table-knife, and B its handle. The blade A is provided with a flat tang, C, the end of which has a V-shaped notch, $a$, made in it, as shown clearly in Fig. 2. The handle B is slotted longitudinally—say, about half its length—as shown at $b$, the slot extending entirely through the handle, or from one edge to the other, and the bottom of the slot has a pointed projection, $c$, of such shape that it will fit into the notch $a$ of the tang. (See Fig. 2.) The tang C is equal in width to the slot $b$, the edges of the former being flush with the edges of the latter when the tang is fitted in the slot, and a rivet, D, passes transversely through the tang and handle, as shown clearly in Fig. 1. By this arrangement the tang C is prevented from being withdrawn from the handle B by the rivet D, and the tang is prevented from shifting laterally in the handle or working on the rivet in consequence of the projection $c$ fitting in the notch $a$ of the tang, as will be fully understood by referring to Fig. 2.

This mode of attaching the handle to the implement is extremely simple, forms a firm attachment, and the parts may be adjusted and secured together with great facility and at small cost.

Having thus described my invention, what I claim as new, and desire to secure by Letters Patent, is—

The flat tang C of the implement, provided with a V-shaped notch, $a$, at its end, in combination with the rivet D and the slot $b$ in the handle B, provided with a projection, $c$, at its bottom, of such a shape as to fit into the notch $a$ of the tang, substantially as and for the purpose herein specified.

MATTHEW CHAPMAN.

Witnesses:
E. P. HITCHCOCK,
I. RUSSELL.